Aug. 20, 1968     A. L. ZAVITZ ET AL     3,397,429

PRESSURE-MOLDING APPARATUS

Original Filed May 27, 1965

INVENTORS.
Arnold L. Zavitz,
Ramon D. Vanderveer,

By Albert J. Miller ATTORNEY.

United States Patent Office 3,397,429
Patented Aug. 20, 1968

3,397,429
PRESSURE-MOLDING APPARATUS
Arnold L. Zavitz, Upland, and Ramon D. Vanderveer, Pomona, Calif., assignors to General Dynamics Corporation, Pomona, Calif., a corporation of Delaware
Original application May 27, 1965, Ser. No. 459,412, now Patent No. 3,352,953, dated Nov. 14, 1967. Divided and this application May 10, 1967, Ser. No. 649,393
10 Claims. (Cl. 18—17)

ABSTRACT OF THE DISCLOSURE

Broadly, the disclosure is directed to a method and apparatus which involves the use of precalibrated compression type springs, the springs being disposed between the movable part of the mold and the pressure applying surface of the apparatus. The force of the apparatus is thus applied to the springs rather than to the mold element directly, and the springs serve to apply force to the mold element for compacting the material therein upon heating of the material, thus enabling close control over mold pressure.

---

This application is a divisional application of U.S. Patent application Ser. No. 459,412, filed May 27, 1965, and assigned to the same assignee, now patent No. 3,352,953.

This invention relates generally to molding apparatus for the encapsulation of components such as electronic components.

Heretofore in the art numerous forms of apparatus have been resorted to for the purpose of encapsulating electronic components. In all of such known apparatus, however, the load or the preformed blank of moldable composition and components to be encapsulated have been placed within a mold and heat and pressure applied thereto until the composition flows and conforms to a desired configuration of the die cavity. These prior known processes are generally known as pure compression molding.

The apparatus of this invention differs from the prior known apparatus in that it utilizes precalibrated compression springs wherein the springs are initially compressed and as the molding compound becomes fluid, due to heat applied thereto, the springs tend to close the mold, thus providing a semi-compression molding technique which may utilize low density molding compounds.

The advantages of the present invention over the prior known molding apparatus are as follows: (1) the pressure applied to the components in the mold cavity can be closely controlled due to the novel spring arrangement and size of the springs (ft./lbs.); (2) the density of the material being molded can be held very close as the amount is calculated and weighed for the area of the cavity being encapsulated; (3) the mold cavity is filled with the molding compound and evacuated to remove moisture and air from the compound; (4) the mold cavity can be vibrated to allow the molding compound to settle in the cavity around the compound before and during the evacuating operation; and (5) the process eliminates surface blisters and voids.

A further object of the invention is to provide a molding apparatus particularly adapted for use of low density molding compounds.

Another object of the invention is to provide an apparatus for the encapsulation of electronic components.

Another object of the invention is to provide an apparatus of the compression type technique for the encapsulation of components utilizing low density molding compounds.

Another object of the invention is to provide a molding apparatus utilizing a unique spring arrangement whereby the pressure within the mold can be closely controlled.

Other objects and advantages of the invention will become apparent from the following detailed description taken in connection with the accompanying drawings, in which.

Broadly, the invention involves the use of compression springs in a molding apparatus, the springs being disposed between the movable part of the mold and the pressure applying surface of the apparatus. The force of the apparatus is thus applied to the springs rather than the mold element directly, enabling close control over mold pressure.

As pointed out above, the present invention differs from the known compression type molding methods and apparatus which are generally of the pressure adjustment type as illustrated by U.S. Patent 2,440,806, wherein the more compression applied to the spring the greater the applied pressure to the molding compound. In using the apparatus of this invention, the pressure is calibrated or arrived at during compression of the spring or springs which provides a controlled semi-compression molding method which utilizes a fully compressed spring precalibrated for a desired p.s.i. The unique spring arrangement thus provides an encapsulation technique particularly suited for molding applications utilizing low density molding compounds.

Figure 1:
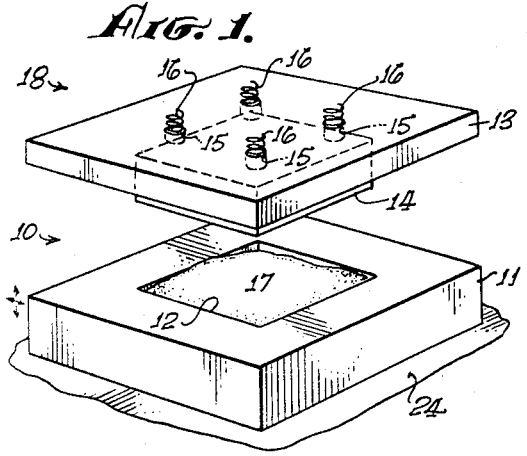
FIG. 1 is perspective view of an embodiment of the mold die prior to application of heat and pressure to the material contained therein.
Figure 2:
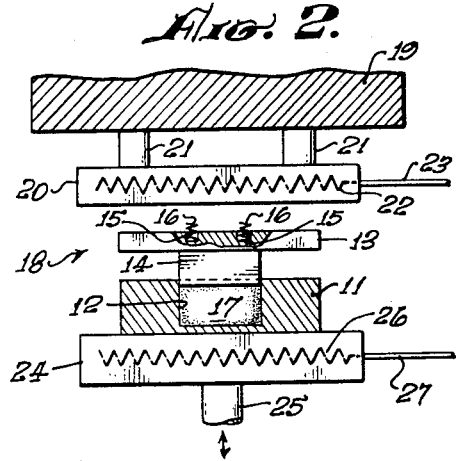
FIG. 2 is a view partially in cross-section showing the FIG. 1 die embodiment positioned in the molding equipment.

Referring now to FIGS. 1 and 2, an embodiment of the apparatus for carrying out the molding process is illustrated. The mold die indicated generally at 10 (see FIG. 1) comprises a die block or base 11 having a cavity or well 12 therein defining the desired configuration of the molded end product, and a die plunger plate 13 including a plunger 14 adapted to be inserted into the cavity 12 of base or block 11. Plate 13 is provided with a plurality of recesses 15 (four being shown in this embodiment) within each of which is positioned an open-coil, precalibrated, compression type spring 16. Mold 10, having a cavity 12 filled with a predetermined amount of encapsulation or molding compound 17, described hereinafter, is positioned in a molding press shown in FIG. 2 and generally indicated at 18. Molding press 18 comprises a stationary head 19 having an upper platen 20 supported therefrom via members 21. Platen 20 includes an internal heating mechanism such as resistance heater unit 22 connected to a power source and control means (not shown) via electrical leads 23. A lower platen 24 is mounted on a cylinder rod 25 or other suitable actuation device, base 11 of mold die 10 being supported thereby. Platen 24, like upper platen 20, includes an internal heating unit such as resistance heater 26 which is adapted to be connected through leads 27 to the power source and control means therefor (not shown). Cylinder rod 25 may be moved upwardly or downwardly by a suitable system such as a conventional hydraulic arrangement (not shown), whereby mold die 10 may be raised or lowered as desired.

To succesfully encapsulate electronic packages, for example, with low density molding compound, by controlled-compound semi-compression molding of this invention, the following procedures should be met:

(1) Calculate the amount of low density molding compound required to fill the cavity being molded.

(2) Determine the molding temperature. This will be the lowest shelf temperature of the components in the electronic package to be encapsulated by the controlled semi-compression molding method.

(3) Determine the pressure of the spring or springs from, for example, a pressure vs. temperature chart, such a chart being described hereinbelow.

The following sequence of steps set forth a manner of encapsulating elements, such as electronic components (not shown), in accordance with the invention by the utilization of the illustrated apparatus and with low density molding compounds.

(1) Position an assembled electronic package (not shown) to be encapsulated into mold cavity 12 of die 10.

(2) Pre-heat mold die 10 to a pre-determined molding temperature.

(3) Pour pre-measured low density molding compound 17 into the cavity 12 of die 10.

(4) Vibrate the mold die 10 to allow molding compound 17 to settle.

(5) Evacuate the mold die 10 to remove air and moisture from the molding compound 17.

(6) Place the springs 16 in recesses 15 of plunger plate 13.

(7) Position the die mold 10 in molding press 18 as illustrated in FIG. 2.

Figure 3:
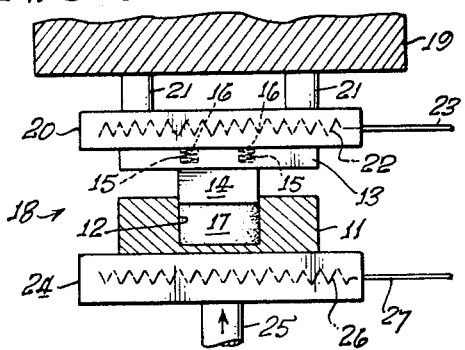
FIGS. 3–6 are partially cross-sectioned views illustrating various steps for carrying out the molding method.
Figure 4:
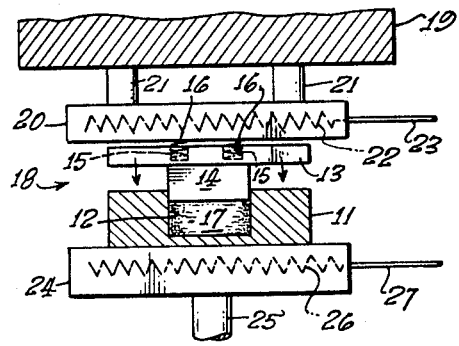
Figure 5:
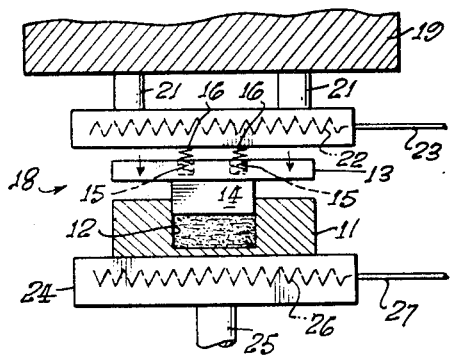

(8) Close press 18 via actuator 25 until springs 16 are completely compressed as shown in FIG. 3. Heat transfer from heating elements 22 and 26 via platens 20 and 24 causes the compound 17 to become fluid whereby the springs 16 force the plunger plate 13 downwardly as illustrated in FIGS. 4 and 5 until the plate 13 closes against base 11 or to a predetermined position with respect to base 11.

Figure 6:
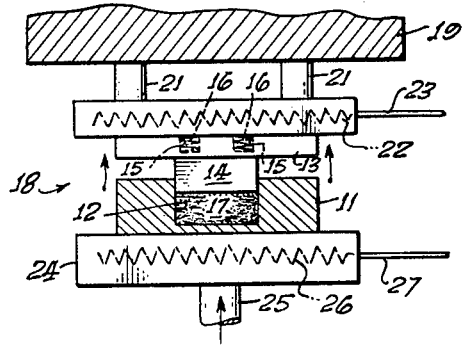

(9) The lower platen 24 is then raised by actuator 25 thus raising mold die 10 until the springs 16 are again compressed against upper platen 20 as shown in FIG. 6. Additionally pressure is then applied to platen 24 to provide a mold die clamping pressure.

(10) Shutting off the energy to heating units 22 and 26 and allowing the mold 10 to cool thus curing the encapsulant 17 and producing an encapsulated electronic unit.

If desired, the vibrating and evacuating steps set forth above may be omitted. Also, in certain applications the step of preheating the mold die may be omitted.

The molding temperature varies for various compounds and/or components for each die cavity configuration. For example, with a die cavity for a 2 cubic inch module a time vs. temperature chart may be utilized with the cure time per cycle being set forth on the Y axis and the temperature on the X axis, the time ranging from 1 to 15 min. with the temperature ranging from 170 to 310 degrees. Thus, by way of example, only, a cure time of 5 min. would be required for 250° or a cure time of 15 min. would be required for 180° with a low density glass filled epoxy molding compound.

The pressure of the compression spring can be determined for example, from a pressure vs. temperature chart wherein the spring pressure per square inch is plotted on the Y axis and the temperature on the X axis. It has been shown that with a glass filled epoxy molding compound that a direct relationship exists between the spring pressure and temperature with, for example, the pressure required for encapsulation of packages with more than 5 square inches of area being greater than that required for packages with less than 5 square inches of area. The range of the spring pressure in the above example being from 0 to 60 pounds per square inch while the temperature ranges from 170 to 330 degrees. Thus, for example, with a temperature of 175 degrees, a spring pressure of 56 lbs./sq. in. or with a temperature of 310 degrees 22 lbs./sq. in. is required for packages over 5 sq. in. area while the same temperatures and under 5 sq. in. area 44 and 16 lbs./sq. in., respectively, are required.

It has thus been shown that the present invention overcomes the disadvantages of prior known compression molding processes and that this invention provides the following principle advantages: (1) the springs, pre-calibrated to the required p.s.i., give accurate control pressure applied to the cavity at extremely low pressures; and (2) low density compounds with, for example, glass micro balloons as filler can be molded without crushing the glass micro balloons.

While specific apparatus has been illustrated along with a specific sequence of steps for carrying out the invention, modifications and changes will become apparent to those skilled in the art, and it is intended to cover in the appended claims, all such changes and modifications as come within the spirit and scope of the invention.

What we claim is:

1. A semi-compression molding device comprising a die and a press apparatus, said die including a die block having a cavity therein, a cover member having a protruding portion configured to cooperate with said die cavity for decreasing the area of the cavity, at least one counterbore in the surface of said cover member opposite said protruding portion, and a resilient member positioned in said counterbore; said press apparatus including a pair of platen means, one of said platen means being movable, each of said platen means being provided with heating means, and means for moving said movable platen means.

2. The molding device defined in claim 1, wherein said heating means is of the resistance heating type.

3. A semi-compression molding apparatus comprising a die means and a press means; said die means including a die block having a cavity therein, a cover member for said die block, said cover member having a protruding portion on one surface adapted to be inserted into said die cavity, said cover member having a plurality of counterbores in the surface opposite said protruding portion, and a pre-calibrated resilient member positioned in each of said plurality of counterbores; said press means including an upper platen and a lower platen, means for heating each of said platens, and means for actuating at least one of said platens.

4. The molding apparatus defined in claim 3, wherein said heating means includes a resistance heater unit in each of said platens.

5. The molding apparatus defined in claim 3, wherein said upper platen is stationary.

6. The molding apparatus defined in claim 3, wherein said lower platen is moved by said actuator means, whereby, with said die means positioned in said press means, said lower platen is moved upwardly by said actuating means to compress said resilient members against said upper platen.

7. A die adapted for encapsulating components comprising: a block having a cavity therein, said cavity being configured to produce the desired encapsulated unit and adapted to contain the assembled components to be encapsulated and low density encapsulation compound, a cover plate, said cover plate including a protruding portion, said protruding portion being configured to cooperate with said die cavity to reduce the area of the cavity and produce the desired encapsulated unit, said cover plate additionally including a plurality of counterbores on the surface opposite said protruding portion, said counterbores being adapted to retain pre-calibrated spring members.

8. The die defined in claim 7 in combination with a pressing apparatus: said pressing apparatus including a stationary platen, a movable platen, means for moving said movable platen, and means for heating each of said platens, whereby, with said die positioned in said pressing apparatus, movement of said movable platen toward said stationary platen by said moving means causes said pre-calibrated spring members to at least partially compress, and whereby heating of said platens by said heating means causes associated encapsulation compound contained in said die cavity to fluidize whereby said spring members expand and forces said protruding die portion into said cavity, and whereby further movement of said movable platen toward said stationary platen by said moving means causes said spring member to at least partially recompress.

9. The combination defined in claim 8, wherein said platens are positioned with respect to one another such that said stationary platen is the upper platen and said movable platen is the lower platen.

10. The combination defined in claim 8, wherein said platen heating means includes a resistance heater unit for each platen.

References Cited

UNITED STATES PATENTS

| | | | |
|---|---|---|---|
| 2,390,991 | 12/1945 | Codish | 18—16 X |
| 2,459,205 | 1/1949 | Wells et al. | 18—42 X |
| 2,569,226 | 9/1951 | Carter. | |
| 2,800,684 | 7/1957 | Luthman | 18—16.5 |
| 2,874,751 | 2/1959 | Norton | 18—17 X |
| 2,913,766 | 11/1959 | Haller | 18—16.5 X |
| 3,084,391 | 4/1963 | Parstorfer | 249—97 |
| 3,095,611 | 7/1963 | Borah | 18—36 |
| 3,315,310 | 4/1967 | Weissman | 18—17 |

J. HOWARD FLINT, JR., *Primary Examiner.*